(12) United States Patent
Zhou

(10) Patent No.: US 12,045,413 B2
(45) Date of Patent: Jul. 23, 2024

(54) TOUCH DISPLAY PANEL AND DISPLAY DEVICE

(71) Applicant: Wuhan China Star Optoelectronics Semiconductor Display Technology Co., Ltd., Wuhan (CN)

(72) Inventor: Shang Zhou, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/605,046

(22) PCT Filed: Jul. 27, 2021

(86) PCT No.: PCT/CN2021/108638
§ 371 (c)(1),
(2) Date: Oct. 20, 2021

(87) PCT Pub. No.: WO2022/267164
PCT Pub. Date: Dec. 29, 2022

(65) Prior Publication Data
US 2024/0019962 A1 Jan. 18, 2024

(30) Foreign Application Priority Data
Jun. 25, 2021 (CN) .......................... 202110709021.0

(51) Int. Cl.
*G06F 3/041* (2006.01)
(52) U.S. Cl.
CPC ........ *G06F 3/04164* (2019.05); *G06F 3/0412* (2013.01); *G06F 3/0416* (2013.01)

(58) Field of Classification Search
CPC ... G06F 3/04164; G06F 3/0412; G06F 3/0416
See application file for complete search history.

(56) References Cited

U.S. PATENT DOCUMENTS

| 10,732,752 | B1 * | 8/2020 | Zhu | G06F 3/0416 |
| 2021/0191549 | A1 * | 6/2021 | Kim | G06F 3/0412 |
| 2021/0191614 | A1 * | 6/2021 | Fang | G06F 3/04166 |

FOREIGN PATENT DOCUMENTS

| CN | 102209945 A | 10/2011 |
| CN | 104765501 A | 7/2015 |
| CN | 107463295 A | 12/2017 |
| CN | 107479742 A | 12/2017 |
| CN | 109871146 A | 6/2019 |
| CN | 110187797 A | 8/2019 |

(Continued)

*Primary Examiner* — Kenneth B Lee, Jr.
(74) *Attorney, Agent, or Firm* — Nathan & Associates; Menachem Nathan

(57) ABSTRACT

A touch display panel and a display device are provided. The touch display panel includes: a plurality of touch electrodes, a plurality of touch signal lines, a plurality of demultiplexing circuits, a plurality of touch channel signal lines, a plurality of pads, and a driving chip. The demultiplexing circuits can selectively electrically connect one of multiple of the touch signal lines to a corresponding one of the touch channel signal lines. A number of the pads can be decreased, and layout design space required by the touch channel signal lines and the pads can be reduced, so as to increase freedom of selection of the driving chip.

19 Claims, 7 Drawing Sheets

(56) References Cited

FOREIGN PATENT DOCUMENTS

| | | | |
|---|---|---|---|
| CN | 112419949 | A | 2/2021 |
| CN | 112436047 | A | 3/2021 |
| CN | 112987959 | A | 6/2021 |
| KR | 20210064036 | A | 6/2021 |

* cited by examiner

TOUCH DISPLAY PANEL AND DISPLAY DEVICE

TECHNICAL FIELD

The present disclosure relates to the display technology field, and more particularly to a touch display panel and a display device.

BACKGROUND ART

A mainstream touch technology of existing small-sized and medium-sized active matrix organic light-emitting diode (AMOLED) touch display panels is divided into two categories including an add-on type and a direct on cell touch (DOT) type. In the DOT technology, it is necessary to directly fabricate touch-related touch electrodes, touch signal lines connecting the touch electrodes and pads, and the pads on a package layer of an AMOLED touch display panel in an array process. Compared with the add-on touch technology, the AMOLED touch display panel adopting the DOT technology has characteristics of light, thin, and being bent easily, and is more suitable for a development trend of AMOLED flexible foldable display technology.

Technical Problem

Based on a basic driving principle, the DOT technology is mainly divided into two categories including a self-capacitive type and a mutual-capacitive type. The mutual-capacitive DOT technology is limited to a large-area touch due to a resistance-capacitive loading (RC loading). Capacitances of touch electrodes in the self-capacitive DOT are almost unchanged, and thus effect caused by a change of a screen size is less. In the mutual-capacitive DOT technology, a column or a row of touch electrodes in an entire touch area usually correspond to a touch signal line and a touch channel signal line. A number of overall signal lines is fewer. The touch channel signal line is less limited by a size and space of a panel, required layout design space is small, and design freedom is high. In the self-capacitive DOT technology, since a single touch electrode in an entire touch area corresponds to a touch signal line, a number of required touch signal lines is large. When a size of a touch area is large, the number of the touch signal lines is more. As such, more touch channel signal lines and pads are required to lead touch signals to a driving chip. This brings certain restrictions on the layout design space of the touch display panel, design of pads in a binding area, and selection of the driving chip.

In summary, the conventional self-capacitive touch display panel has the problem of a large number of touch channel signal lines. Accordingly, there is a need to provide a touch display panel and a display device to improve the defect.

Technical Solution

Embodiments of the present disclosure provide a touch display panel and a display device for solving the problem of a large number of touch channel signal lines.

An embodiment of the present disclosure provides a touch display panel, including:
 a plurality of touch electrodes arranged in an array and insulated from one another;
 a plurality of touch signal lines, each of the touch electrodes connected to a first terminal of a corresponding one of the touch signal lines;
 a plurality of demultiplexing circuits, signal output terminals of each of the demultiplexing circuits connected to second terminals of multiple of the touch signal lines;
 a plurality of touch channel signal lines, a terminal of each of the touch channel signal lines connected to a signal input terminal of a corresponding one of the demultiplexing circuits, the demultiplexing circuits configured to selectively electrically connect one of the multiple of the touch signal lines to a corresponding one of the touch channel signal lines;
 a plurality of pads, the other terminal of each of the touch channel signal lines connected to a corresponding one of the pads; and
 a driving chip, the driving chip electrically connected to the pads.

According to an embodiment of the present disclosure, the touch display panel includes:
 a display area; and
 a binding area disposed at one side of the display area, the pads disposed in the binding area;
 wherein the demultiplexing circuits are disposed between the binding area and the display area.

According to an embodiment of the present disclosure, at least two demultiplexing circuit areas are disposed in parallel between the binding area and the display area, the demultiplexing circuits are disposed in the demultiplexing circuit areas, the touch display panel includes a plurality of display signal lines, and the display signal lines led out from the display area are respectively disposed between the adjacent demultiplexing circuit areas and at sides of the demultiplexing circuit areas close to edges of the touch display panel.

According to an embodiment of the present disclosure, the display signal lines include a plurality of data signal lines, and the data signal lines led out from the display area are disposed between the adjacent demultiplexing circuit areas.

According to an embodiment of the present disclosure, the display signal lines include a plurality of gate driving signal lines, and the gate driving signal lines led out from the display area are disposed between each of the demultiplexing circuit areas and a corresponding one of the edges of the touch display panel.

According to an embodiment of the present disclosure, the display signal lines include a plurality of power signal lines, the touch display panel includes a plurality of detection control signal lines for connecting control terminals of the demultiplexing circuits to the pads, and the power signal lines in the demultiplexing circuit areas partially overlap with the touch channel signal lines and the detection control signal lines in a thickness direction of the touch display panel.

According to an embodiment of the present disclosure, in the demultiplexing circuit areas, the touch channel signal lines and the detection control signal lines are disposed on a side of a metal layer where the power signal lines are located away from metal layers where the data signal lines and the gate drive signal lines are located.

According to an embodiment of the present disclosure, the touch display panel includes a touch layer, a display layer, and a driving chip, and the touch electrodes and the touch signal lines are disposed in the touch layer;

wherein the touch layer and the display layer share the driving chip; or the driving chip includes a display driving chip and a touch driving chip, the display layer is connected to the display driving chip, and the touch layer is connected to the touch driving chip.

According to an embodiment of the present disclosure, the touch display panel includes a chip on film, the chip on film is bonded and connected to the binding area, and the driving chip is disposed on the chip on film.

According to an embodiment of the present disclosure, the display driving chip is disposed between the two adjacent demultiplexing circuit areas, and the data signal lines are connected to the display driving chip;

wherein the touch display panel further includes a flexible printed circuit board, the flexible printed circuit board is bonded and connected to the pads in the binding area, and the touch driving chip is disposed on the flexible printed circuit board.

According to an embodiment of the present disclosure, the gate driving signal lines include a first group and a second group;

wherein the first group is led out from the display area and connected to the corresponding pads in the binding area, and the second group is led out from the display area and connected to the display driving chip.

According to an embodiment of the present disclosure, each column of the touch electrodes corresponds to the demultiplexing circuits, in each column of the touch electrodes, two adjacent ones of the touch electrodes are connected to different demultiplexing circuits, and at least one touch electrode is spaced between two touch electrodes connected to the same demultiplexing circuit.

According to an embodiment of the present disclosure, each of the demultiplexing circuits includes:

a first-stage demultiplexing circuit, each of the first-stage demultiplexing circuit includes a plurality of first demultiplexers, and a signal input terminal of each of the first demultiplexers connected to a corresponding one of the touch signal lines; and a second-stage demultiplexing circuit, each of the second-stage demultiplexing circuit includes a plurality of second demultiplexers, a signal input terminal of each of the second demultiplexers connected to signal output terminals of at least two of the first demultiplexers, and a plurality of signal output terminals of the second demultiplexers are connected to the same touch channel signal line.

According to an embodiment of the present disclosure, the touch display panel further includes a first high-frequency detection signal line, a ground signal line, and a plurality of detection control signal lines, and each of the first demultiplexers includes a first thin film transistor, a second thin film transistor, and a third thin film transistor; and in each of the first demultiplexers, source electrodes of the first thin film transistor, the second thin film transistor, and the third thin film transistor are connected to the same touch signal line, gate electrodes of the first thin film transistor, the second thin film transistor, and the third thin film transistor are respectively connected to different detection control signal lines, a drain electrode of the first thin film transistor is connected to a signal input terminal of a corresponding one of the second demultiplexer, a drain electrode of the second thin film transistor is connected to the first high-frequency detection signal line, and a third drain electrode of the third thin film transistor is connected to the ground signal line.

According to an embodiment of the present disclosure, the touch display panel further includes a second high-frequency detection signal line, and each of the second demultiplexers includes a fourth thin film transistor and a fifth thin film transistor; and in each of the second demultiplers, a source electrode of the fourth thin film transistor and a source electrode of the fifth thin film transistor are connected with each other and are connected to the drain electrodes of the first thin film transistors of at least two of the first demultiplexers, a drain electrode of the fourth thin film transistor is connected to the touch channel signal line, a gate electrode of the fourth thin film transistor is connected to a corresponding one of the detection control signal lines, a drain electrode of the fifth thin film transistor is connected to the second high-frequency detection signal line and the ground signal line, and a gate electrode of the fifth thin film transistor is connected to a corresponding one of the detection control signal lines.

An embodiment of the present disclosure provides a display device, including:

a plurality of touch electrodes arranged in an array and insulated from one another;

a plurality of touch signal lines, each of the touch electrodes connected to a first terminal of a corresponding one of the touch signal lines;

a plurality of demultiplexing circuits, signal output terminals of each of the demultiplexing circuits connected to second terminals of multiple of the touch signal lines;

a plurality of touch channel signal lines, a terminal of each of the touch channel signal lines connected to a signal input terminal of a corresponding one of the demultiplexing circuits, the demultiplexing circuits configured to selectively electrically connect one of the multiple of the touch signal lines to a corresponding one of the touch channel signal lines;

a plurality of pads, the other terminal of each of the touch channel signal lines connected to a corresponding one of the pads; and a driving chip, the driving chip electrically connected to the pads.

According to an embodiment of the present disclosure, the touch display panel includes:

a display area; and a binding area disposed at one side of the display area, the pads disposed in the binding area;

wherein the demultiplexing circuits are disposed between the binding area and the display area.

According to an embodiment of the present disclosure, at least two demultiplexing circuit areas are disposed in parallel between the binding area and the display area, the demultiplexing circuits are disposed in the demultiplexing circuit areas, the touch display panel includes a plurality of display signal lines, and the display signal lines led out from the display area are respectively disposed between the adjacent demultiplexing circuit areas and at sides of the demultiplexing circuit areas close to edges of the touch display panel.

According to an embodiment of the present disclosure, the display signal lines include a plurality of data signal lines, and the data signal lines 151 led out from the display area are disposed between the adjacent demultiplexing circuit areas.

According to an embodiment of the present disclosure, the display signal lines include a plurality of gate driving signal lines, and the gate driving signal lines led out from the display area are disposed between each of the demultiplexing circuit areas and a corresponding one of the edges of the touch display panel.

Advantageous Effects

Advantageous effects of the embodiments of the present disclosure are described as follows. The embodiments of the present disclosure provide a touch display panel and a display device. The touch display panel includes: a plurality of touch electrodes arranged in an array and insulated from one another; a plurality of touch signal lines, each of the touch electrodes connected to a first terminal of a corresponding one of the touch signal lines; a plurality of demultiplexing circuits, signal output terminals of each of the demultiplexing circuits connected to second terminals of multiple of the touch signal lines; a plurality of touch channel signal lines, a terminal of each of the touch channel signal lines connected to a signal input terminal of a corresponding one of the demultiplexing circuits; a plurality of pads, the other terminal of each of the touch channel signal lines connected to a corresponding one of the pads; and a driving chip, the driving chip electrically connected to the pads. The demultiplexing circuits can selectively electrically connect one of the multiple of the touch signal lines to a corresponding one of the touch channel signal lines. A number of the touch channel signal lines can be decreased, thereby decreasing a number of the pads and reducing layout design space required by the ouch channel signal lines and the pads to increase freedom of selection of the driving chip of the touch display panel.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF EMBODIMENTS

Figure 1:
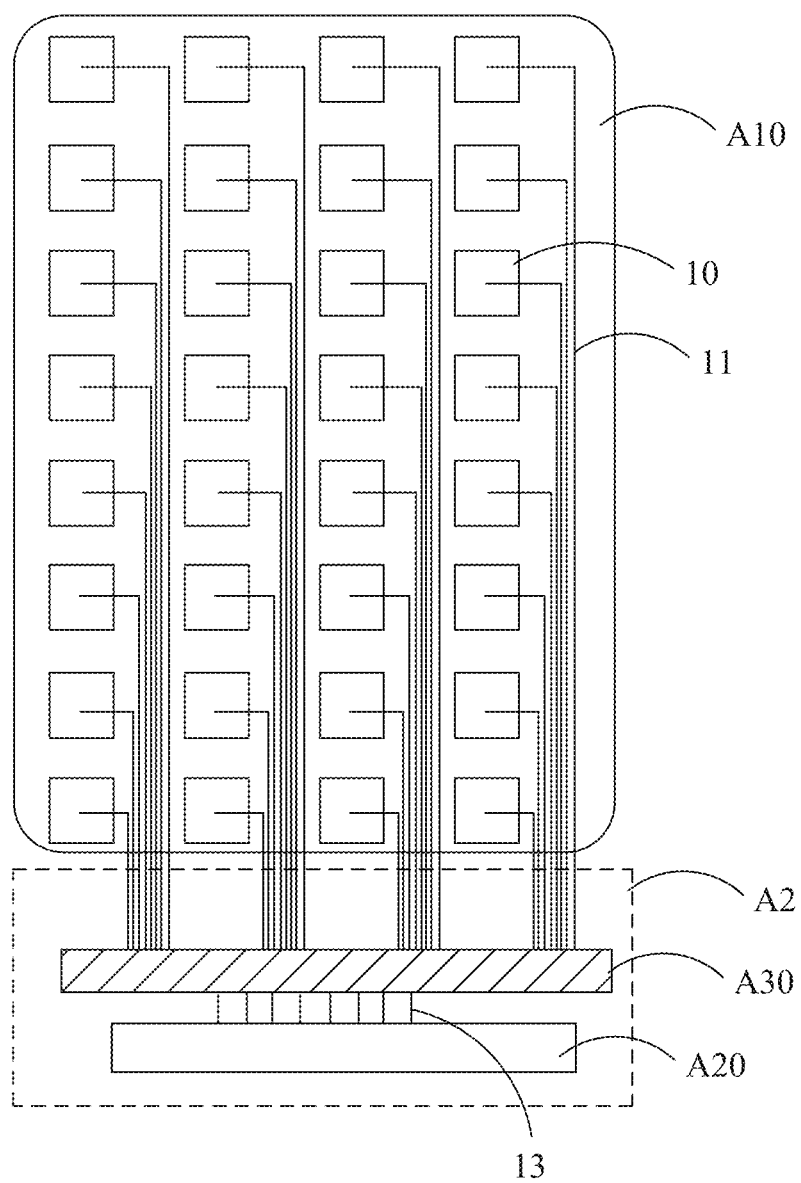
FIG. 1 illustrates a structural diagram of a first type of touch display panel provided by an embodiment of the present disclosure.

The following embodiments are referring to the accompanying drawings for exemplifying specific implementable embodiments of the present disclosure. Directional terms described by the present disclosure, such as upper, lower, front, back, left, right, inner, outer, side and etc., are only directions by referring to the accompanying drawings, and thus the used directional terms are used to describe and understand the present disclosure. However, the present disclosure is not limited thereto. In the drawings, structure-like elements are labeled with like reference numerals.

The following further describes the present disclosure with reference to the accompanying drawings and the embodiments.

Figure 2:
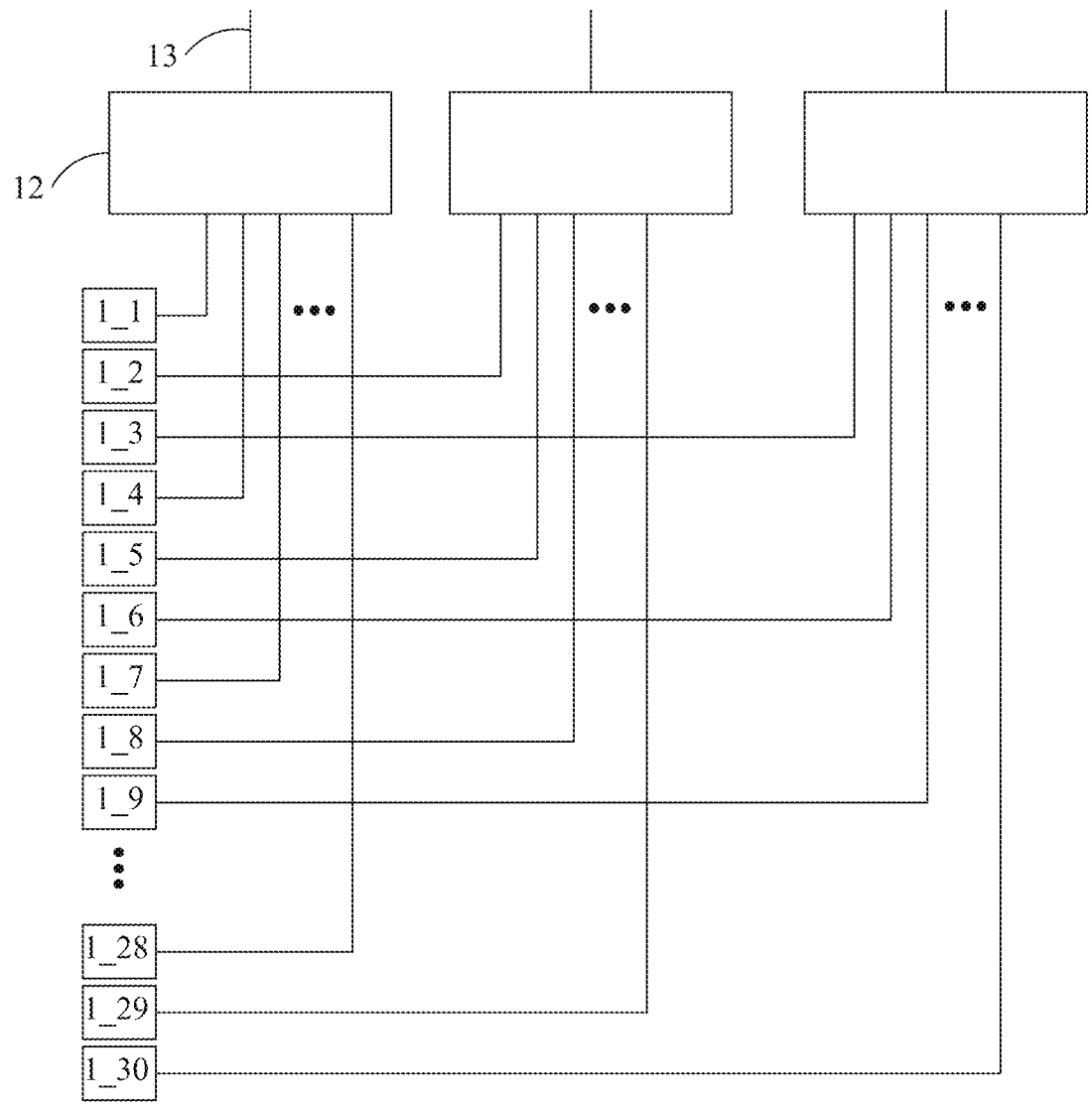
FIG. 2 illustrates a schematic diagram of a connection relationship of demultiplexing circuits and touch electrodes provided by the embodiment of the present disclosure.

An embodiment of the present disclosure provides a touch display panel, which is described in detail below with reference to FIG. 1. As shown in FIGS. 1 and 2, FIG. 1 illustrates a structural diagram of a first type of touch display panel provided by an embodiment of the present disclosure, and FIG. 2 illustrates a schematic diagram of a connection relationship of demultiplexing circuits and touch electrodes provided by the embodiment of the present disclosure. The touch display panel includes a plurality of touch electrodes 10 arranged in an array and a plurality of touch signal lines 11 arranged at intervals. Each of the touch electrodes 10 is connected to a first terminal of a corresponding one of the touch signal lines 11.

The touch display panel further includes a plurality of demultiplexing circuits 12 and a plurality of touch channel signal lines 13. Signal output terminals of multiple of the demultiplexing circuits 12 are connected to second terminals of multiple of the touch signal lines 11. Each of the touch channel signal lines 13 is connected to a signal input terminal of a corresponding one of the demultiplexing circuits 12. The demultiplexing circuits 12 are configured to selectively electrically connect one of the multiple of the touch signal lines 11 to a corresponding one of the touch channel signal lines 13. The multiple of the touch electrodes 10 and the multiple of the touch signal lines 11 correspond to one of the touch channel signal lines 13. As such, a number of the touch channel signal lines 13 can be decreased, and layout design space required by the ouch channel signal lines 13 can be reduced to increase freedom of selection of a driving chip of the touch display panel.

In the embodiment of the present disclosure, the touch display panel is a self-capacitive DOT touch display panel. Each of the touch electrodes 10 is connected to a corresponding one of the demultiplexing circuits 12 through one of the touch signal lines 11. Each of the demultiplexing circuits 12 is configured to transmit a touch signal to the driving chip through one of the touch channel signal lines. When a finger approaches or touches the touch display panel, capacitance of the finger is superimposed on capacitance of at least one touch electrode 10 to increase the capacitance of the at least one touch electrode 10. During touch detection, the touch electrode array in an X axis (a horizontal direction) and a Y axis (a vertical direction) is detected to compare capacitance changes of all of the touch electrodes 10 before and after the touch. A coordinate in the X axis and a coordinate in the Y axis are determined and combined into a plane touch coordinate.

Each column of the touch electrodes corresponds to the demultiplexing circuits 12. In each column of the touch electrodes, two adjacent ones of the touch electrodes are connected to different demultiplexing circuits 12, and at least one touch electrode is spaced between two touch electrodes connected to the same demultiplexing circuit 12.

In the embodiment of the present disclosure, the touch display panel includes a plurality of columns of touch electrodes. Each of the columns of the touch electrodes includes thirty touch electrodes, and the thirty touch electrodes in each of the columns are respectively connected to three touch channel signal lines 13 through three demultiplexing circuits 12. Two touch electrodes are spaced between two touch electrodes connected to the same demultiplexing circuit 12.

As shown in FIG. 2, a first column of the touch electrodes in the touch display panel is taken as an example. The first column of the touch electrodes includes touch electrodes 1_1, 1_2, 1_3, 1_4, 1_5, 1_6, 1_7, 1_8, 1_9, . . . , 1_28, 1_29, and 1_30 arranged from top to bottom. The touch electrodes 1_1, 1_4, 1_7, 1_10, 1_13, 1_16, 1_19, 1_22, 1_25, and 1_28 are connected to a first demultiplexing circuit 12, the touch electrodes 1_2, 1_5, 1_8, 1_11, 1_14, 1_17, 1_20, 1_23, 1_26, and 1_29 are connected to a second touch channel signal line 13 through a second demultiplexing circuit 12, and the touch electrodes 1_3, 1_6, 1_9, 1_12, 1_15, 1_18, 1_21, 1_24, 1_27, and 1_30 are connected to a third touch channel signal line 13 through a third demultiplexing circuit 12. The three touch channel signal lines 13 are independent from one another. The touch electrodes 1_1 and 1_4 are connected to the same demultiplexing circuit 12. The touch electrodes 1_2 and 1_3 are spaced between the touch electrodes 1_1 and 1_4. In this way, touch detection can be performed, through the three touch channel signal lines 13, on three touch electrodes in the first column of the touch electrodes simultaneously. For the entire touch display panel, touch detection can be performed on three rows of touch electrodes through the touch channel signal lines. Compared with the touch detection row-by-row, performing the touch detection on multiple rows of the touch electrodes can increase detection efficiency of the touch electrodes, thereby increasing touch sensitivity of the touch display panel.

It should be noted that FIG. 2 only takes the touch electrodes in the first column in the touch display panel as an example. A connection mode of the touch electrodes in other columns, the demultiplexing circuit 12, and the touch channel signal lines in the touch display panel is the same as the connection mode of the touch electrodes in the first column and not repeated herein.

In practical applications, a number of the touch electrodes in a row of the touch electrodes is not limited to thirty, and can also be 20, 25, 35, 40 and so on. A number of the touch channel signal lines 13 and a number of the demultiplexing circuits 12 corresponding to each column of the touch electrodes are not limited to the three, and can also be two, four or more. A number of the touch electrodes spaced between two touch electrodes connected to the same demultiplexing circuit can also be two, three, four or more. In this way, the touch detection can be performed, through multiple channel signal lines 13 and multiple demultiplexing circuits 12, on multiple rows of the touch electrodes simultaneously.

Specifically, as shown in FIG. 2, each of the demultiplexing circuits 12 includes a first-stage demultiplexing circuit 121 and a second-stage demultiplexing circuit 122. The first-stage demultiplexing circuit 121 includes a plurality of first demultiplexers Demux1. A signal input terminal of each of the first demultiplexers Demux1 is connected to a corresponding one of the touch signal lines 11. The second-stage demultiplexer circuit 122 includes a plurality of second demultiplexers Demux2. A signal input terminal of each of the second demultiplexers Demux2 is connected to signal output terminals of at least two of the first demultiplexers Demux1. A plurality of signal output terminals of the second demultiplexers Demux2 are connected to the same touch channel signal line 13.

Figure 3:
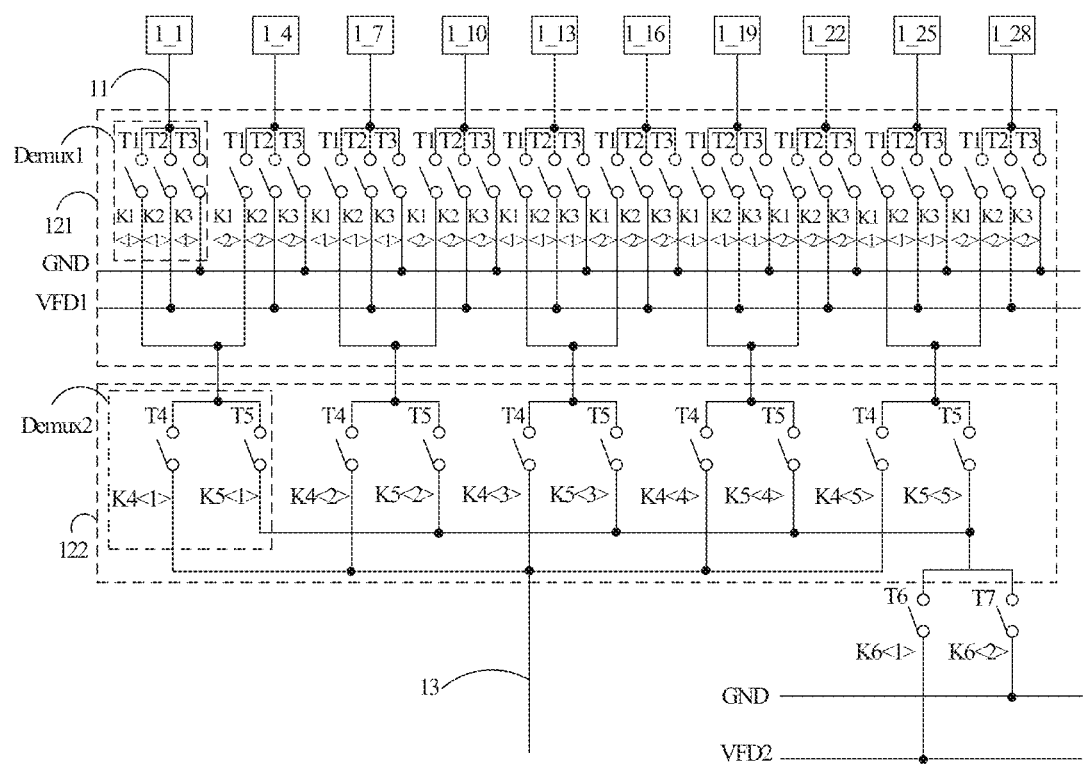
FIG. 3 illustrates a structural diagram of a demultiplexing circuit provided by an embodiment of the present disclosure.

As shown in FIGS. 2 and 3, FIG. 3 illustrates a structural diagram of a demultiplexing circuit provided by an embodiment of the present disclosure. In the embodiment of the present disclosure, the touch electrodes in the first column of the touch electrodes connected to the first demultiplexing circuit 12 and the first touch channel signal line 13 are taken as an example for description. Each of the first-stage demultiplexing circuits 121 includes ten first demultiplexers Demux1, and each of the second-stage demultiplexing circuits 122 includes five second demultiplexers Dmeux2. The signal output terminals of two adjacent ones of the first demultiplexers Demux1 are connected to the signal input terminal of one of the second demultiplexers Demux2. Turning on and turning off the two adjacent ones of the first demultiplexers Demux1 can selectively connect one of the two adjacent ones of the first demultiplexers Demux1 to the one of the second demultiplexers Demux2. As such, only fifteen signal lines are required to connect the thirty touch electrodes in one column to fifteen second demultiplexers Demux2, thereby achieving to transmit signals using fifteen signal lines through the first demultiplexers Demux1 instead of thirty touch signal lines 11 which are required previously.

As shown in FIG. 3, the signal output terminals of five second demultiplexers Demux2 are connected to the same touch channel signal line 13. Turning on and turning off the five second demultiplexers Demux2 can selectively connect one of the five second demultiplexers Demux2 to the touch channel signal line 13. As such, transmitting signals using three channel signal lines 13 through the first demultiplexers Demux1 and the second demultiplexers Demux2 instead of thirty touch channel signal lines 13 which are required previously can be achieved, thereby decreasing the number of the touch channel signal lines 13 significantly.

Further, the touch display panel further includes a first high-frequency detection signal line VFD1, a ground signal line GND, and a plurality of detection control signal lines. Each of the first demultiplexers Demux1 includes a first thin film transistor T1, a second thin film transistor T2, and a third thin film transistor T3. Source electrodes of the first thin film transistor T1, the second thin film transistor T2, and the third thin film transistor T3 are all connected to the same touch signal line 11. Gate electrodes of the first thin film transistor T1, the second thin film transistor T2, and the third thin film transistor T3 are respectively connected to different detection control signal lines. A drain electrode of the first thin film transistor T1 is connected to the signal input terminal of a corresponding one of the second demultiplexer Demux2. A drain electrode of the second thin film transistor T2 is connected to the first high-frequency detection signal line VFD1. A third drain electrode of the third thin film transistor T3 is connected to the ground signal line GND.

In the embodiment of the present disclosure, the detection control signal lines respectively transmit detection control signals K1<1>, K2<1>, K3<1>, K1<2>, K2<2>, and K3<2>. For the first demultiplexers Demux1 corresponding to touch electrodes 1_(3N−2), touch electrodes 1_(3N−1), and touch electrodes 1_3N (1≤N<10, and N is an odd number), the gate electrodes of the first thin film transistors T1 all receive the detection control signal K1<1>, the gate electrodes of the second thin film transistors T2 all receive the detection control signal K2<1>, and the gate electrodes of the third thin film transistors T3 all receive the detection control signal K3<1>. For the first demultiplexers Demux1 corresponding to touch electrodes 1_(3N−2), touch electrodes 1_(3N−1), and touch electrodes 1_3N (1≤N<10, and N is an even number), the gate electrodes of the first thin film transistors T1 all receive the detection control signal K1<2>, the gate electrodes of the second thin film transistors T2 all receive the detection control signal K2<2>, and the gate electrodes of the third thin film transistors T3 all receive the detection control signal K3<2>.

Specifically, as shown in FIG. 3, the touch electrodes in the first column of the touch electrodes connected to the first demultiplexing circuit 12 and the first touch channel signal line 13 are taken as an example for description. When N is an odd number, for the first demultiplexers Demux1 corresponding to the touch electrode 1_(1), the touch electrode 1_(7), the touch electrode 1_(13), the touch electrode 1_(19), and the touch electrodes 1_(25), the gate electrodes of the first thin film transistors T1 all receive the detection control signal K1<1>, the gate electrodes of the second thin film transistors T2 all receive the detection control signal K2<1>, and the gate electrodes of the third thin film transistors T3 all receive the detection control signal K3<1>. When N is an even number, for the first demultiplexers Demux1 corresponding to the touch electrode 1_(4), the touch electrode 1_(10), the touch electrode 1_(16), the touch electrode 1_(22), and the touch electrodes 1_(28), the gate electrodes of the first thin film transistors T1 all receive the detection control signal K1<2>, the gate electrodes of the second thin film transistors T2 all receive the detection control signal K2<2>, and the gate electrodes of the third thin film transistors T3 all receive the detection control signal K3<3>.

It should be noted that FIG. 3 only takes the touch electrodes in the first column of the touch electrodes connected to the first demultiplexing circuit 12 and the first touch channel signal line 13 as an example. Connection relationships of the gate electrodes of the thin film transistors of the first demultiplexers Demux1 corresponding to the touch electrodes in the first column of the touch electrodes connected to the second or third demultiplexing circuit 12 and the corresponding detection control signals and connection relationships of the gate electrodes of the thin film transistors of the first demultiplexers Demux1 corresponding to the touch electrodes in the other columns of the touch electrodes and the corresponding detection control signals also conform the above-mentioned rule and are not repeated herein.

Figure 4:
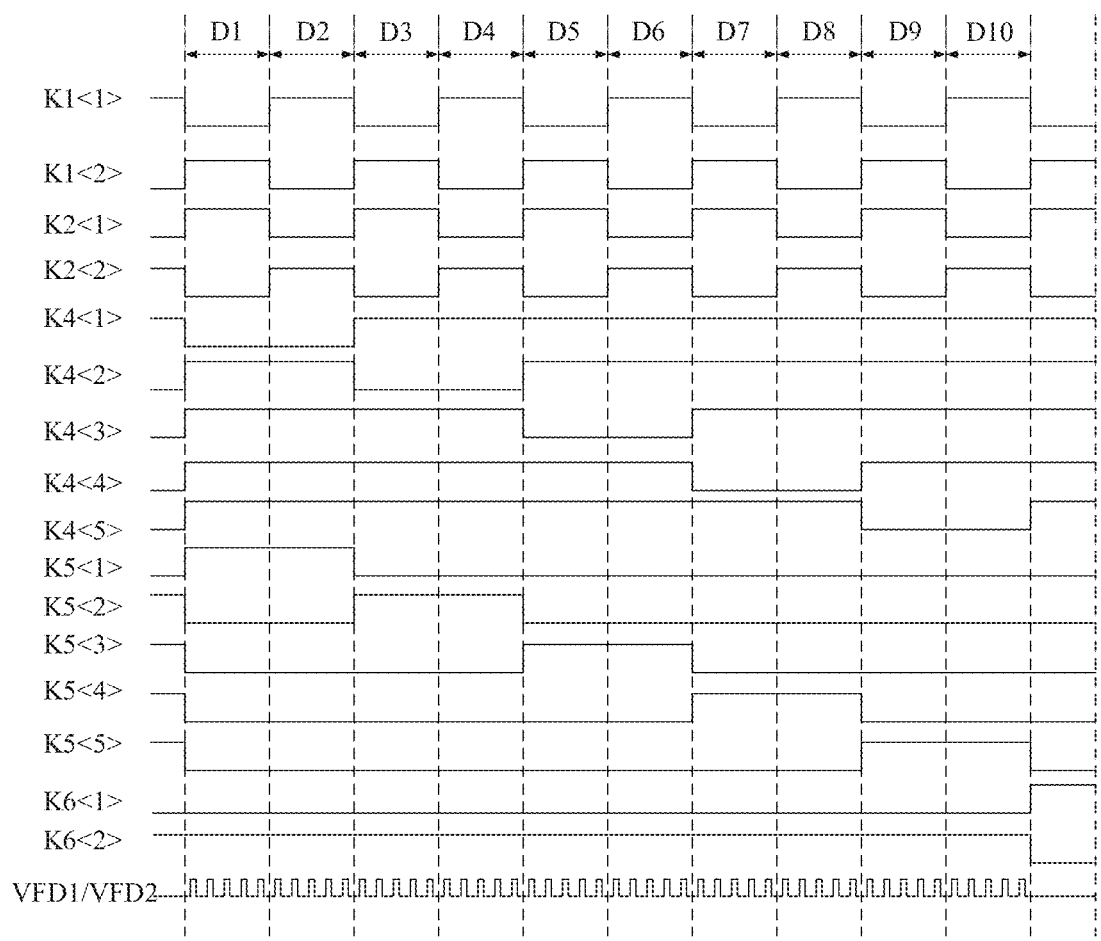
FIG. 4 illustrates a timing diagram of the demultiplexing circuit provided by an embodiment of the present disclosure.

Further, as shown in FIG. 4, FIG. 4 illustrates a timing diagram of the demultiplexing circuit provided by an embodiment of the present disclosure. The detection control signals K1<1>, K2<1>, K3<1> (not shown in FIG. 4), K1<2>, K2<2>, and K3<3> (not shown in FIG. 4) are all alternating current signals. A voltage level of the detection control signal K1<1> is opposite to a voltage level of the detection control signal K1<2>. The voltage level of the detection control signal K1<1> is the same as a voltage level of the detection control signal K2<2>. The voltage level of the detection control signal K1<2> is the same as a voltage level of the detection control signal K2<1>. In this way, by control of each of the above-mentioned detection signals, detection control signals received by the first demultiplexers Demux1 corresponding to adjacent three rows of the touch electrodes can be the same, and can be different from detection control signals received by the first demultiplexers Demux1 corresponding to three rows of the touch electrodes adjacent to the adjacent three rows of the touch electrodes, thereby achieve effect of perform the touch detection on three rows of the touch electrodes synchronously.

Further, the touch display panel further includes a second high-frequency detection signal line VFD2. Each of the second demultiplexers Demux2 includes a fourth thin film transistor T4 and a fifth thin film transistor T5. In each of the second demultiplers Demux2, a source electrode of the fourth thin film transistor T4 and a source electrode of the fifth thin film transistor T5 are connected in parallel and are connected to the drain electrodes of the first thin film transistors T1 of at least two of the first demultiplexers Demux1, a drain electrode of the fourth thin film transistor T4 is connected to the touch channel signal line 13, a gate electrode of the fourth thin film transistor T4 is connected to a corresponding one of the detection control signal lines, a drain electrode of the fifth thin film transistor T5 is connected to the second high-frequency detection signal line VFD2 and the ground signal line GND, and a gate electrode of the fifth thin film transistor T5 is connected to a corresponding one of the detection control signal lines.

In the embodiment of the present disclosure, as shown in FIG. 3, each of the second demultiplexers Demux2 includes the fourth thin film transistor T4 and the fifth thin film transistor T5. In a first one of the second demultiplexers Demux2, the source electrode of the fourth thin film transistor T4 and the source electrode of the fifth thin film transistor T5 are connected to each other and are connected to the drain electrodes of the first thin film transistors T1 of the first demultiplexers Demux1 respectively corresponding to the touch electrode 1_1 and the touch electrode 1_4. In a second one of the second demultiplexers Demux2, the source electrode of the fourth thin film transistor T4 and the source electrode of the fifth thin film transistor T5 are connected to each other and are connected to the drain electrodes of the first thin film transistors T1 of the first demultiplexers Demux1 respectively corresponding to the touch electrode 1_7 and the touch electrode 1_9. The rest can be deduced by analogy. In a fifth one of the second demultiplexers Demux2, the source electrode of the fourth thin film transistor T4 and the source electrode of the fifth thin film transistor T5 are connected to each other and are connected to the drain electrodes of the first thin film transistors T1 of the first demultiplexers Demux1 respectively corresponding to the touch electrode 1_25 and the touch electrode 1_28.

In the same second-stage demultiplexing circuit 122, the gate electrodes of the fourth thin film transistors T4 in the five second demultiplexers Demux2 respectively receive detection control signals K4<1>, K4<2>, K4<3>, K4<4> and K4<5>, the drain electrodes of the fifth thin film transistors T5 in the five second demultiplexers Demux2 are respectively connected to the second high-frequency detection signal line VFD2 through a sixth thin film transistor T6 and connected to the ground signal line GND through a seventh thin film transistor T7. A gate electrode of the sixth thin film transistor T6 receives a detection control signal K6<1>, and a gate electrode of the seventh thin film transistor T7 receives a detection control signal K6<2>.

In the embodiment of the present disclosure, as shown in FIG. 4, a voltage level of the detection control signal K4<1> is opposite to a voltage level of the detection control signal K5<1>. A voltage level of the detection control signal K4<2> is opposite to a voltage level of the detection control signal K5<2>. The rest can be deduced by analogy. A voltage level of the detection control signal K4<5> is opposite to a voltage level of the detection control signal K5<5>. A voltage level of the detection control signal K6<1> is opposite to a voltage level of the detection control signal K6<2>.

In the embodiment of the present disclosure, a first high-frequency detection signal transmitted by the first high-frequency detection signal line VFD1 and a second high-frequency detection signal transmitted by the second high-frequency detection signal line VFD2 are both alternating current signals having the same waveform as the touch detection signals. It can be understood that when the touch detection is performed on the touch electrodes in the first to third rows, if the touch electrodes in the fourth row receive voltage signals with different potentials from the touch electrodes in the third row, voltage differences are generated, if the touch electrodes in the fourth row and the touch electrodes in the third row receive voltage signals having different voltage levels, to form capacitances among the touch electrodes in the fourth row and the touch electrodes in the third row and between the touch signal lines and among the touch signal lines respectively connected to the touch electrodes in the fourth row and the touch electrodes in the third row. Accordingly, a resistance-capacitive loading (RC loading) in the touch circuit of the touch display panel is increased, and touch sensitivity of the touch display panel is decreased. When one of the first high-frequency detection signal and the second high-frequency detection signal which have the same waveform and the voltage level is inputted to the touch electrodes in multiple rows adjacent to the first to third rows, the first high-frequency detection signal or the second high-frequency detection signal is not inputted to the driving chip. The voltage differences among the touch electrodes in the first to third rows and the touch electrodes in the multiple rows adjacent to the first to third rows can be decreased, thereby decreasing the resistance-capacitive loading in the touch circuit of the touch display panel and increasing the touch sensitivity of the touch display panel.

It can be understood that when the touch detection is performed on the touch electrodes in the first to third rows, the touch electrodes in multiple rows far away from the touch electrodes in the first to third rows are inputted by a ground signal through the ground signal line GND. Since the ground signal is a direct current signal and has a low voltage level, the touch sensitivity of the touch display panel can be guaranteed while the load of the touch display panel is reduced.

With reference to FIGS. 2 to 4, the touch electrodes in the first column in the touch display panel are taken as an example for description. A complete touch detection process includes the following stages.

In a first stage D1, the detection control signals K1<1> and K4<1> are low voltage signals. In the first demultiplexers Demux1 corresponding to the touch electrodes 1_1, 1_2, and 1_3, the first thin film transistors T1 are turned on, and the other thin film transistors are turned off. In the second demultiplexers Demux2, the fourth thin film transistors T4 are turned on, and the fifth transistors T5 are turned off. The touch detection signals are respectively inputted to the touch electrodes 1_1, 1_2, and 1_3 by three touch channel signal lines 13. The driving chip compares the transmitted touch signals with received touch detection feedback signals to determine whether the touch electrodes 1_1, 1_2, and 1_3 are touched. For the entire touch display panel, it can be synchronously determined whether the touch electrodes in the first to third rows are touched.

At the same time, in the first demultiplexers Demux1 corresponding to the touch electrodes 1_(3N−2), the touch electrodes 1_(3N−1), and the touch electrodes 1_(3N) (1<N≤10, and N is an even number), the second thin film transistors T2 are turned on, and the other thin film transistors are turned off. The first high-frequency detection signal is inputted to the touch electrodes 1_(3N−2), the touch electrodes 1_(3N−1), and the touch electrodes 1_(3N) (1<N≤10, and N is an even number) by the first high-frequency detection signal line VFD1.

At the same time, the detection control signals K4<2>, K4<3>, K4<4>, K4<5>, and K6<2> are all high voltage level signals, and the detection control signals K5<2>, K5<3>, K5<4>, K5<5>, and K6<1> are all low voltage level signals. For the touch electrodes 1_(3N−2), the touch electrodes 1_(3N−1), and the touch electrodes 1_(3N) (3≤N<10, and N is an odd number), the first thin film transistors T1 of the first demultiplexers Demux1 are turned on, the fourth thin film transistors T4 of the second demultiplexers Demux2 are turned off, and the fifth thin film transistors T5 and the sixth thin film transistor T6 are turned on. The second high-frequency detection signal is inputted to the touch electrodes 1_(3N−2), the touch electrodes 1_(3N−1), and the touch electrodes 1_(3N) (3≤N<10, and N is an odd number) by the second high-frequency detection signal line VFD2, thereby reducing interferences of the touch electrodes in adjacent rows and increasing the touch sensitivity of the touch display panel.

In practical applications, in the first stage, K6<1> can also be a high voltage signal, and K6<2> can also be a high voltage level signal. The sixth thin film transistor T6 is turned off, and the seventh thin film transistors T7 are turned on. The ground signal is inputted to the touch electrodes 1_(3N−2), the touch electrodes 1_(3N−1), and the touch electrodes 1_(3N) (3≤N<10, and N is an odd number) by the ground signal line GND.

In a second stage D2, the detection control signals K1<2> and K4<1> are low voltage level signals. In the first demultiplexers Demux1 corresponding to the touch electrodes 1_4, 1_5, and 1_6, the first thin film transistors T1 are turned on, and the other thin film transistors are turned off. In the second demultiplexers Demux2, the fourth thin film transistors T4 are turned on, and the fifth transistors T5 are turned off. The touch detection signals are respectively inputted to the touch electrodes 1_4, 1_5, and 1_6 by three touch channel signal lines 13. The driving chip compares the transmitted touch signals with received touch detection feedback signals to determine whether the touch electrodes 1_4, 1_5, and 1_6 are touched. For the entire touch display panel, it can be synchronously determined whether the touch electrodes in the fourth to sixth rows are touched.

At the same time, the second thin film transistors T2 of the first demultiplexers Demux1 corresponding to the touch electrodes 1_(3N−2), the touch electrodes 1_(3N−1), and the touch electrodes 1_(3N) (1≤N<10, and N is an odd number) are turned on. The touch electrodes 1_(3N−2), the touch electrodes 1_(3N−1), and the touch electrodes 1_(3N) (1≤N<10, and N is an odd number) respectively receive the first high-frequency detection signal.

At the same time, the detection control signals K4<2>, K4<3>, K4<4>, K4<5>, and K6<2> are all high voltage level signals, and the detection control signals K5<2>, K5<3>, K5<4>, K5<5>, and K6<1> are all voltage level signals. For the touch electrodes 1_(3N−2), the touch electrodes 1_(3N−1), and the touch electrodes 1_(3N) (4<N≤10, and N is an even number), the first thin film transistors T1 of the first demultiplexers Demux1 are turned on, the fourth thin film transistors T4 of the second demultiplexers Demux2 are turned off, and the fifth thin film transistors T5 and the sixth thin film transistor T6 are turned on. The second high-frequency detection signal is inputted to the touch electrodes 1_(3N−2), the touch electrodes 1_(3N−1), and the touch electrodes 1_(3N) (4<N≤10, and N is an even number) by the second high-frequency detection signal line VFD2, thereby reducing interferences of the touch electrodes in adjacent rows and increasing the touch sensitivity of the touch display panel.

The rest can be deduced by analogy. Third to tenth stages can be alternatively use the same driving method as the first stage D1 and the second stage D2. The touch detection is performed on the touch electrodes in a unit including three rows. Differences are described as follows. In the third stage, when the touch detection is performed on the touch electrodes in the seventh to twelfth rows, the detection control signal K4<2> becomes a low voltage level signal, and the detection control signals K4<1>, K4<3>, K4<4>, and K4<5> are all low voltage level signals. In the fourth stage D4, when the touch detection is performed on the touch electrodes in the thirteenth to eighteenth rows, the detection control signal K4<3> becomes a low voltage level signal, and the detection control signals K4<1>, K4<2>, K4<4>, and K4<5> are all low voltage level signals. The rest can be deduced by analogy. In the ninth stage and the tenth stage, when the touch detection is performed on the touch electrodes in the twenty-fifth to thirty rows, the detection control signal K4<5> becomes a low voltage level signal, and the detection control signals K4<1>, K4<2>, K4<3>, and K4<4> are all low voltage level signals. As such, it can be ensured that only one of the five second demultiplexers Demux2 is electrically connected to the touch channel signal line 13.

Further, the touch display panel includes a display area A10 and a binding area A20. The binding area A20 is disposed at one side of the display area A10. A plurality of pads are disposed in the binding area A20. The demultiplexing circuits 12 are disposed between the binding area A20 and the display area A10. The touch channel signal lines 13 are led out from the signal input terminals of the demultiplexing circuits 12 and respectively connect to corresponding pads.

In the embodiment of the present disclosure, the touch display panel includes a lower frame area A2. The lower frame area A2 is disposed at one side of the display area A10. The binding area A20 is located in the lower frame area A2. The lower frame area A2 further includes a demultiplexing circuit area A30 disposed therein. The demultiplexing circuits 12 are all disposed in the demultiplexing circuit area A30. Each of the touch channel signal lines 13 corresponds to a pad. The driving chip can be bonded and connected to the pads through a flip chip film or a flexible printed circuit board. The number of the touch channel signal lines 13 is decreased by disposing the demultiplexing circuits 12, and a number of the pads in the binding area A20 can also be decreased significantly. As such, the layout design space required by the pads can be reduced to increase freedom of selection of the driving chip of the touch display panel.

Further, at least two demultiplexing circuit areas A30 are disposed in parallel between the binding area A20 and the display area A10. The touch display panel includes a plurality of display signal lines 15. The display signal lines 15 led out from the display area A10 are respectively disposed between the adjacent demultiplexing circuit areas A30 and at sides of the demultiplexing circuit areas A30 close to edges of the touch display panel.

Figure 5:
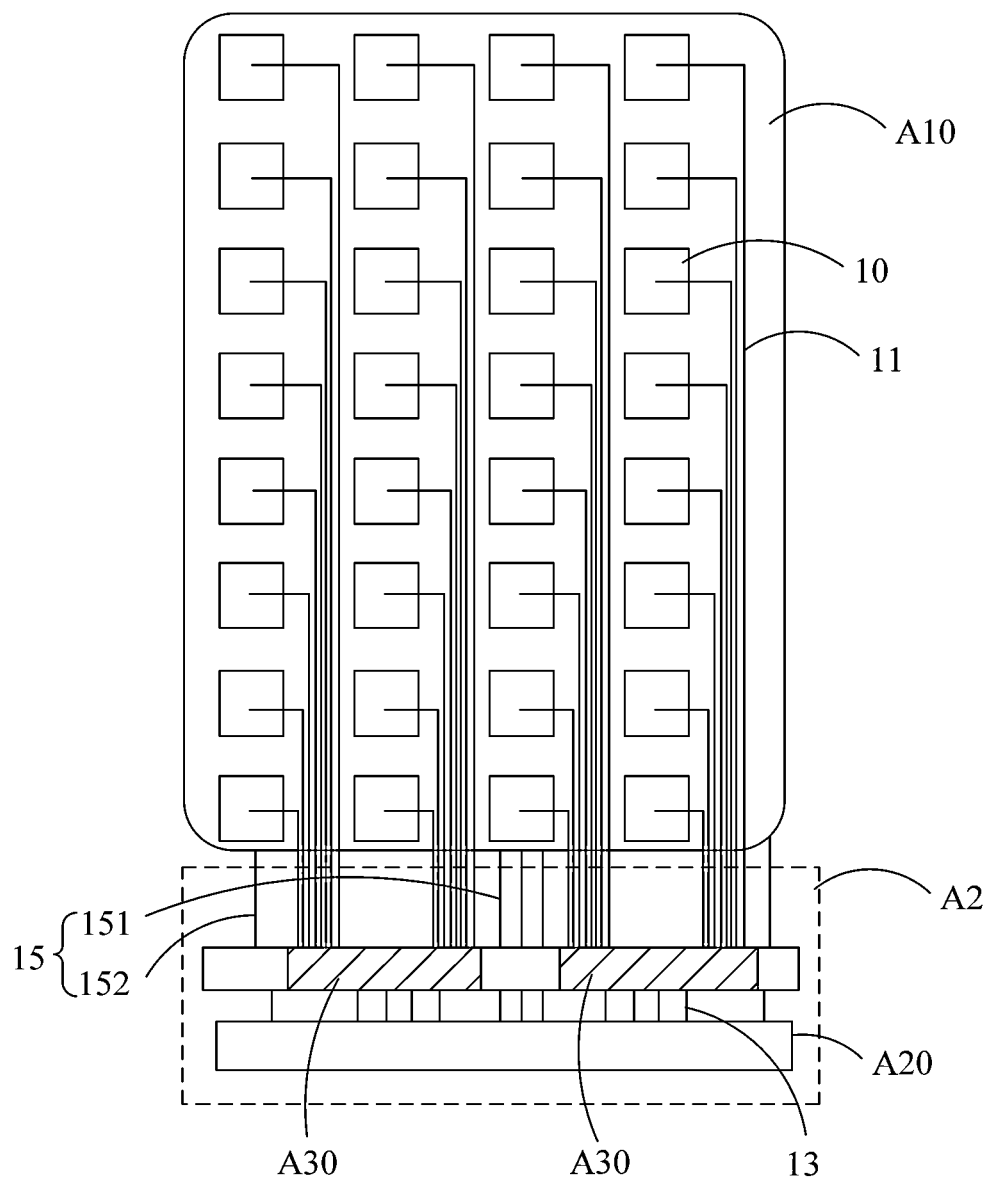
FIG. 5 illustrates a structural diagram of a second type of touch display panel provided by an embodiment of the present disclosure.

In an embodiment of the present disclosure, as shown in FIG. 5, FIG. 5 illustrates a structural diagram of a second type of touch display panel provided by an embodiment of the present disclosure. The structure of the second type of the touch display panel shown in FIG. 5 is approximately the same as the structure of the first type of the touch display panel shown in FIG. 1. A difference is that two demultiplexing circuit areas A30 are disposed in parallel between the binding area A20 and the display area A10 in the second type of the touch display panel in FIG. 5. The demultiplexing circuits 12 are all disposed in the demultiplexing circuit areas A30. The display signal lines are configured to transmit various display signals for display to the display area A10. The display signal lines 15 led out from the display area A10 are respectively disposed between the adjacent demultiplexing circuit areas A30 and at sides of the demultiplexing circuit areas A30 close to edges of the touch display panel.

In some other embodiments, a number of the demultiplexing circuit areas A30 is not limited to two in the above-mentioned embodiment, but can also be three or more than three. The display signal lines 15 are disposed between any two of the three or more demultiplexing circuit areas A30 are at sides of the demultiplexing circuit areas A30 close to edges of the touch display panel.

Further, the display signal lines 15 include a plurality of data signal lines 151. The data signal lines 151 led out from the display area A10 are disposed between the adjacent demultiplexing circuit areas A30.

In the embodiment of the present disclosure, as shown in FIG. 5, the data signal lines 151 led out from a lower edge of the display area A10 is located between the two demultiplexing circuit areas A30. The data signal lines 151 are configured to transmit data signals (Data) for controlling luminance of each sub-pixel in the display area A10. The data signals transmitted by the data signal line 151 and the touch signals transmitted by the touch signal lines 11 and the touch channel signal lines 13 are all alternating current signals. Accordingly, when the data signal lines 151 led out from the lower edge of the display area A10 are located between the two demultiplexing circuit areas A30, it can be avoided that the data signal lines 151 overlap with the touch signal lines 11 and the touch channel signal lines 13 in a direction perpendicular to the touch display panel, thereby reducing interference effect of the data signal lines 151 on the touch signal lines 11 and the touch channel signal lines 13.

It should be noted that FIG. 5 only illustrates that the data signal lines 151 led out from the lower edge of the display area A10 are located between the two demultiplexing circuit areas A30a from the perspective of the plane where the touch display panel is located in FIG. 5. In a cross section perpendicular to the touch display panel, the data signal lines 151, the touch signal lines 11, and the touch channel signal lines 13 can be located in the same film layer or in different film layers. A positional relationship of the film layer or layers where the data signal lines 151, the touch signal lines 11, and the touch channel signal lines 13 are located can be designed according to requirements and is not limited herein.

Further, the display signal lines 15 include a plurality of gate driving signal lines 152. The gate driving signal lines 152 led out from the display area A10 are disposed between each of the demultiplexing circuit areas A30 and the corresponding edge of the touch display panel.

Figure 7:
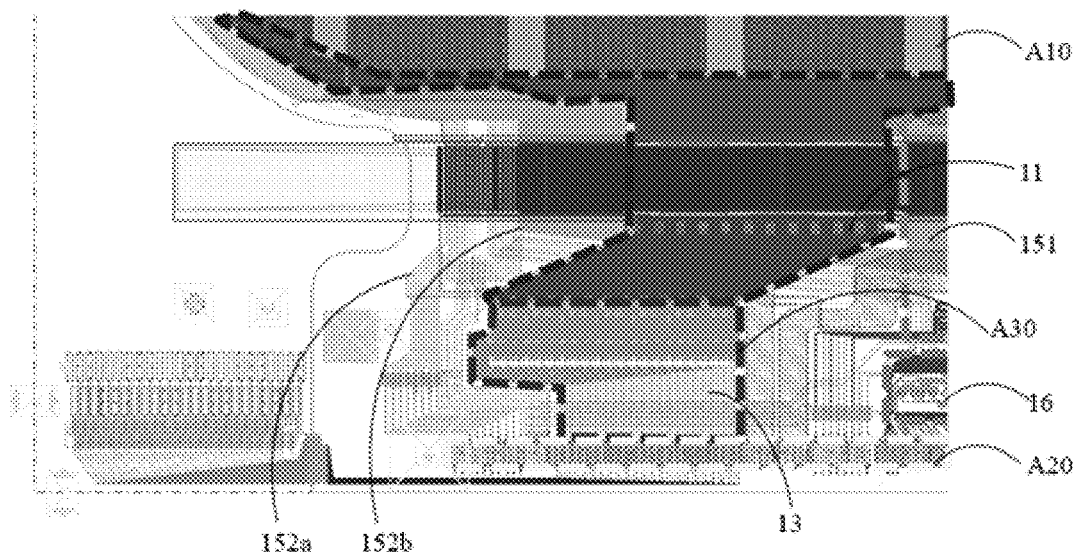
FIG. 7 illustrates a schematic diagram of a layout of the third type of touch display panel provided by the embodiment of the present disclosure.

In an embodiment of the present disclosure, as shown in FIG. 5 and FIG. 7, FIG. 7 illustrates a schematic diagram of a partial layout of the touch display panel provided by an embodiment of the present disclosure. FIG. 7 only illustrates the demultiplexing circuit area A30 at a left side and a layout of the touch display panel at a left side of the demultiplexing circuit areas A30 at the left side. The gate driving signal lines 152 led out from the display area A10 are disposed at the side of the demultiplexing circuit area A30 at the left side close to the edge of the left side of the touch display panel and at the side of the demultiplexing circuit area A30 at a right side close to the edge of the right side of the touch display panel. A layout of the right side is not shown in FIG. 5 and is the same as the layout of the left side. The gate driving signal lines 152 are configured to transmit gate driving signals for controlling whether each sub-pixel emits light. The gate driving signal and the touch signals transmitted by the touch signal lines 11 and the touch channel signal lines 13 are all alternating current signals. Accordingly, when the gate driving signal lines 152 led out from the lower edge of the display area A10 are located at the sides of the demultiplexing circuit areas A30 close to the edges of the touch display panel, it can be avoided that the gate driving signal lines 152 overlap with the touch signal lines 11 and the touch channel signal lines 13 in the direction perpendicular to the touch display panel, thereby reducing interference effect of the gate driving signal lines 152 on the touch signal lines 11 and the touch channel signal lines 13.

It should be noted that FIG. 5 only illustrates that the gate driving signal lines 152 led out from the lower edge of the display area A10 are located between the demultiplexing circuit areas A30a and the edges of the touch display panel from the perspective of the plane where the touch display panel is located in FIG. 5. In the cross section perpendicular to the touch display panel, the gate driving signal lines 152, the touch signal lines 11, and the touch channel signal lines 13 can be located in the same film layer or in different film layers. A positional relationship of the film layer or layers where the gate driving signal lines 152, the touch signal lines 11, and the touch channel signal lines 13 are located can be designed according to requirements and is not limited herein.

Further, the display signal lines 15 include a plurality of power signal lines (not shown in the figures). The touch display panel includes the detection control signal lines (the detection control signal lines are the signal lines for transmitting the detection control signals k1<1> to k6<1>) for connecting the control terminals of the demultiplexing circuits (the control terminals of the demultiplexing circuits are the gate electrodes of the first demultiplexer Demux1 and the second demultiplexer Demux2) to the pads. In the demultiplexing circuit area(s) A30, the power signal lines partially overlap with the touch channel signal lines 13 and the detection control signal lines in a thickness direction of the touch display panel.

In the embodiment of the present disclosure, the power signal lines include a positive power signal line and a negative power signal line. The positive power signal line is configured to transmit a positive power signal (VDD) to the display area A10. The negative signal line is configured to transmit a negative power signal (VSS) to the display area A10. The positive power signal and the negative power signal are both constant direct current signals. The touch detection signals transmitted by the touch channel signal lines 13 and the detection control signals transmitted by the detection control signal lines are all alternating current signals. In the demultiplexing circuit area (a) A30, the positive power signal line and the negative power signal line which partially overlap with the touch channel signal lines 13 and the detection control signal lines can isolate the touch channel signal lines 13 and the detection control signal lines from the data signal lines 151 and the gate driving signal lines 152, thereby further reducing the interference effect of the data signal lines 151 and the gate driving signal lines 152 on the touch channel signal lines 13 and the detection control signal lines.

Further, in the demultiplexing circuit area(s) A30, the touch channel signal lines 13 and the detection control signal lines are disposed on a side of a metal layer where the power signal lines are located away from metal layers where the data signal lines 151 and the gate drive signal lines 152 are located.

In the embodiment of the present disclosure, in the demultiplexing circuit area(s) A30, the touch channel signal lines 13 and the detection control signal lines, the data signal lines 151, the gate drive signal lines 152, and the power signal lines are respectively disposed in different metal layers. A metal layer where the data signal lines 151 are located and a metal layer where the gate drive signal lines 152 are located are both located below a metal layer where the power signal lines are located. A metal layer which the touch channel signal lines 13 and the detection control signal lines are located is located above the metal layer where the power signal lines are located. As such, each distance between the touch channel signal lines 13 or the detection control signal lines and the data signal lines 151 and the gate driving signal lines 152 can be further increased, thereby reducing the interference effect of the data signal lines 151 and the gate driving signal lines 152 on the touch signal lines 11 and the touch channel signal lines 13.

Further, the touch display panel includes a touch layer, a display layer, and a driving chip. The touch electrodes 10 and the touch signal lines 11 are disposed in the touch layer. The touch layer and the display layer share the same driving chip. Alternatively, the driving chip includes a display driving chip and a touch driving chip. The display layer is connected to the display driving chip, and the touch layer is connected to the touch driving chip.

In an embodiment of the present disclosure, the touch display panel is a self-capacitive DOT touch display panel and includes a display layer, an encapsulation layer, and a touch layer. The encapsulation layer covers and protects the display layer. The touch layer is directly formed on the packaging layer. The touch control layer includes the touch electrodes 10 and the touch signal lines 11. As shown in FIG. 4, the touch signal lines are led out from the touch electrodes 10 in the touch layer and connected to the demultiplexing circuit area(s) A30. The touch channel signal lines 13 are led out from the demultiplexing circuit area(s) A30 and connected to the corresponding pads. The data signal lines 151, the gate driving signal lines 152, and the power signal lines are drawn from the display area A10 and connected to the corresponding pads.

The touch display panel further includes a driving chip and a chip on film. The driving chip is disposed on the chip on film. The chip on film is bonded and connected to the pads in the binding area A20. In the embodiment of the present disclosure, the driving chip includes a touch driving chip and a display driving chip. The touch layer is connected to the touch chip, and the display layer is connected to the display driving chip. In some other embodiments, the touch layer and the display layer can also share the same driving chip. The driving chip is a touch and display driving integration (TDDI) chip.

Figure 6:
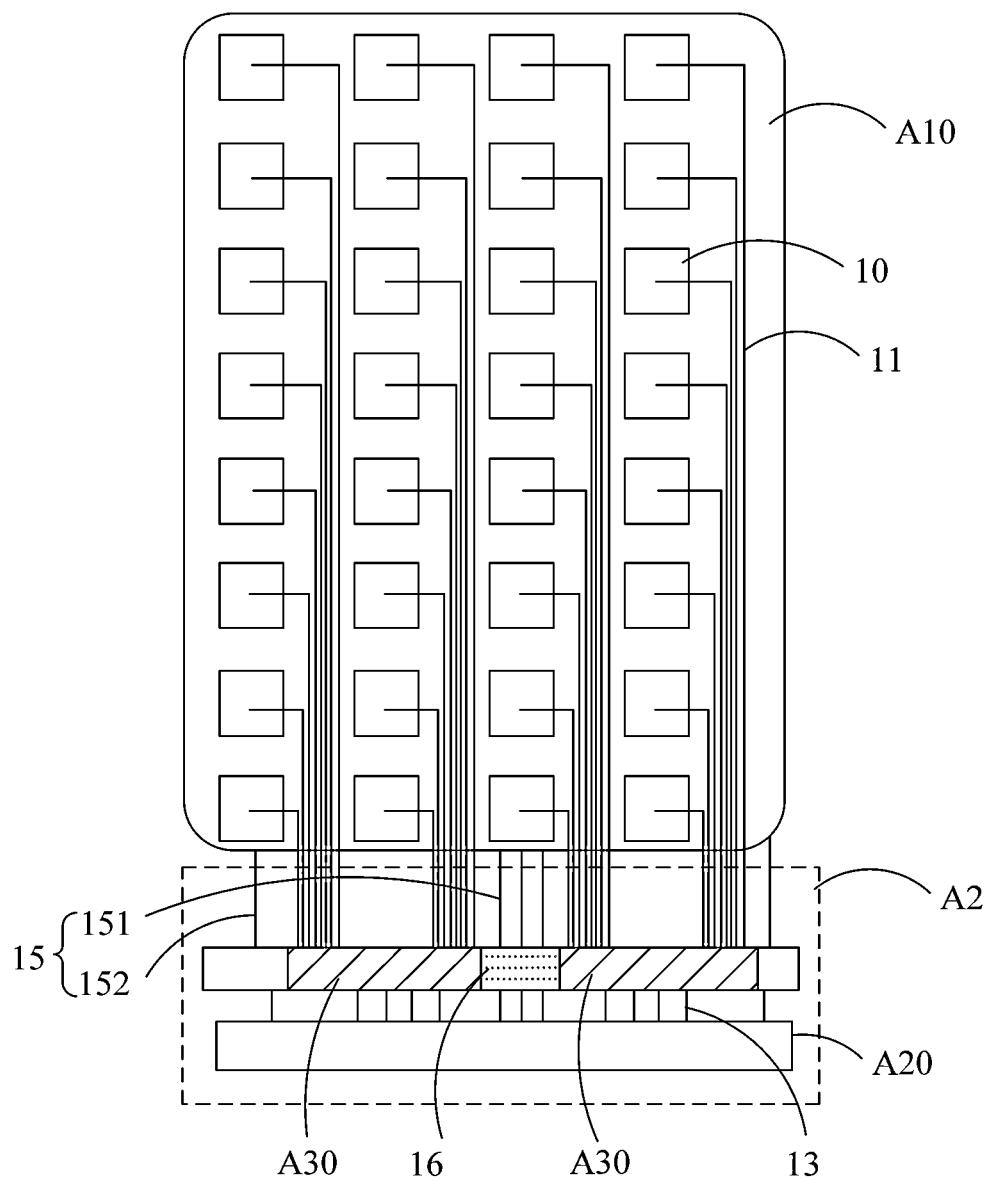
FIG. 6 illustrates a structural diagram of a third type of touch display panel provided by an embodiment of the present disclosure.

As shown in FIG. 6 and FIG. 7, FIG. 6 illustrates a structural diagram of a third type of touch display panel provided by an embodiment of the present disclosure, and FIG. 7 illustrates a schematic diagram of a layout of the touch display panel provided by an embodiment of the present disclosure. The structure of the third type of the touch display panel shown in FIG. 6 is approximately the same as the structure of the second type of the touch display panel shown in FIG. 5. The demultiplexing circuit areas A30 are located between the display area A10 and the binding area A20. The data signal lines 151 of the display signal lines 15 led out from the display area A10 are disposed between the two adjacent demultiplexing circuit areas A30. At least some of the gate driving signal lines 152 are disposed at the sides of the two demultiplexing circuit areas A30 close the edges of the touch display panel. The power signal lines led out from the display area A10 are directly connected to the corresponding pads in the binding area A20.

A difference between the third type of touch display panel in FIG. 6 provided by the embodiment of the present disclosure and the second type of touch display panel in FIG. 3 is that the third type of touch display panel in FIG. 6 and FIG. 7 includes a display driving chip 16 and a touch driving chip. The display driving chip 16 is disposed between the two adjacent demultiplexing circuit areas A30. A plurality of pads can be disposed between the two adjacent demultiplexing circuit areas A30. The display driving chip 16 is bound between the two demultiplexing circuit areas A30 through the pads. The data signal lines 151 led out from the display area A10 are connected to the display driving chip 16 through the pads located between the two demultiplexing circuit areas A30. Then, the display driving chip 16 is connected to the corresponding pads in the binding area A20 through signal wires.

It can be understood that the display driving chip 16 can use fewer pads to receive digital signals provided by an external circuit, to convert the digital signals into the data signals, and then to distribute them to the data signal lines 151 uniformly. Compared with a solution in which the data signal lines 151 are directly connected to the pads, it can be avoided, by bonding the display driving chip 16 in the area between the two demultiplexing circuit areas A30, that the lower frame is broadened when the display driving chip 16 is bonded in the touch display panel. By providing the data signals for the data signal lines 151 through the display driving chip 16, it is not necessary to dispose pads connected to the data signal lines 151 in the binding area A20. Accordingly, a number of the pads in the binding area A20 can be reduced.

As shown in FIG. 7, in the embodiment of the present disclosure, the gate driving signal lines 152 can be divided into a first group 152a and a second group 152b. Each of the first group 152a and the second group 152b includes multiple of the gate driving signal lines 152. A layout of the first group 152a is the same as that of the second type of touch display panel shown in FIG. 2. The first group 152a is led out from the display area A10 and connected to the corresponding pads in the binding area A20. The first group 152a can be disposed between the demultiplexing circuit areas A30 and the edges of the touch display panel. The second group 152b is led out from both sides of the display area A10 of the touch display panel and connected to the display driving chip 16. The second group 152b led out from the display area A10 passes the area between the display area A10 and the demultiplexing circuit areas A30 and overlaps with the touch signal lines 11 in the area in the thickness direction of the display panel. A film layer where the touch signal lines 11 are located can be disposed on a film layer where the second group 152b is located.

It can be understood that the display driving chip 16 further can use fewer pads to receive digital signals provided by an external circuit, to convert the digital signals into the gate driving signals, and then to distribute them to the gate driving signal lines 151 in the second group 152b uniformly. Compared with a solution in which the gate driving signal lines 151 are directly connected to the pads, a number of the pads for connecting the gate driving lines 152 in the binding area A20 can be reduced.

It should be noted that FIG. 7 only illustrates a layout at a left side of the lower frame of the touch display panel. A layout at a right side of the lower frame of the touch display panel is the same as the layout at the left side and is not repeated herein.

In the third type of touch display panel in FIG. 6, the touch driving chip is disposed on a flexible printed circuit board, and the flexible printed circuit board is bonded and connected to the pads in the binding area A20.

An embodiment of the present disclosure further provides a display device. The display device includes a touch display panel and a device main body for supporting the touch display panel. The touch display panel is the touch display panel provided by any one of the above-mentioned embodiments. In the embodiment of the present disclosure, technical effect achieved by the touch display panel in the display device is the same as that of the above-mentioned embodiments and not repeated herein.

In summary, the embodiments of the present disclosure provide a touch display panel and a display device. The touch display panel includes: a plurality of touch electrodes arranged in an array and insulated from one another; a plurality of touch signal lines, each of the touch electrodes connected to a first terminal of a corresponding one of the touch signal lines; a plurality of demultiplexing circuits, signal output terminals of each of the demultiplexing circuits connected to second terminals of multiple of the touch signal lines; a plurality of touch channel signal lines, a terminal of each of the touch channel signal lines connected to a signal input terminal of a corresponding one of the demultiplexing circuits; a plurality of pads, the other terminal of each of the touch channel signal lines connected to a corresponding one of the pads; and a driving chip, the driving chip electrically connected to the pads. The demultiplexing circuits can selectively electrically connect one of the multiple of the touch signal lines to a corresponding one of the touch channel signal lines. A number of the touch channel signal lines can be decreased, thereby decreasing a number of the pads and reducing layout design space required by the ouch channel signal lines and the pads to increase freedom of selection of the driving chip of the touch display panel.

In summary, while the present disclosure is described in connection with preferred embodiments, the preferred embodiments are not intended to limit the present disclosure. Those skilled in the art can make various changes and modifications without departing from the spirit and scope of the present disclosure. Accordingly, the protection scope of the present disclosure is based on the scope defined by the claims.

What is claimed is:
1. A touch display panel, comprising:
a plurality of touch electrodes arranged in an array and insulated from one another;
a plurality of touch signal lines, each of the touch electrodes connected to a first terminal of a corresponding one of the touch signal lines;

a plurality of demultiplexing circuits, signal output terminals of each of the demultiplexing circuits connected to second terminals of multiple of the touch signal lines;

a plurality of touch channel signal lines, a terminal of each of the touch channel signal lines connected to a signal input terminal of a corresponding one of the demultiplexing circuits, the demultiplexing circuits configured to selectively electrically connect one of the multiple of the touch signal lines to a corresponding one of the touch channel signal lines;

a plurality of pads, the other terminal of each of the touch channel signal lines connected to a corresponding one of the pads; and a driving chip, the driving chip electrically connected to the pads;

wherein the touch display panel comprises:

a binding area disposed at one side of the display area, the pads disposed in the binding area; and wherein at least two demultiplexing circuit areas are disposed in parallel between the binding area and the display area, and in the demultiplexing circuit areas, a plurality of detection control signal lines for connecting control terminals of the demultiplexing circuits to the pads and the touch channel signal lines are disposed on a side of a metal layer where a plurality of power signal lines are located away from metal layers where a plurality of data signal lines and a plurality of gate driving signal lines are located.

2. The touch display panel of claim 1, wherein the touch display panel comprises:

a display area;

wherein the demultiplexing circuits are disposed between the binding area and the display area.

3. The touch display panel of claim 2, wherein the demultiplexing circuits are disposed in the demultiplexing circuit areas, the touch display panel comprises a plurality of display signal lines, and the display signal lines led out from the display area are respectively disposed between the adjacent demultiplexing circuit areas and at sides of the demultiplexing circuit areas close to edges of the touch display panel.

4. The touch display panel of claim 3, wherein the data signal lines led out from the display area are disposed between the adjacent demultiplexing circuit areas.

5. The touch display panel of claim 4, wherein the gate driving signal lines led out from the display area are disposed between each of the demultiplexing circuit areas and a corresponding one of the edges of the touch display panel.

6. The touch display panel of claim 5, wherein the power signal lines in the demultiplexing circuit areas partially overlap with the touch channel signal lines and the detection control signal lines in a thickness direction of the touch display panel.

7. The touch display panel of claim 6, wherein the touch display panel comprises a touch layer, a display layer, and a driving chip, and the touch electrodes and the touch signal lines are disposed in the touch layer;

wherein the touch layer and the display layer share the driving chip; or the driving chip includes a display driving chip and a touch driving chip, the display layer is connected to the display driving chip, and the touch layer is connected to the touch driving chip.

8. The touch display panel of claim 7, wherein the touch display panel comprises a chip on film, the chip on film is bonded and connected to the bonding area, and the driving chip is disposed on the chip on film.

9. The touch display panel of claim 7, wherein the display driving chip is disposed between the two adjacent demultiplexing circuit areas, and the data signal lines are connected to the display driving chip;

wherein the touch display panel further comprises a flexible printed circuit board, the flexible printed circuit board is bonded and connected to the pads in the binding area, and the touch driving chip is disposed on the flexible printed circuit board.

10. The touch display panel of claim 9, wherein the gate driving signal lines comprise a first group and a second group;

wherein the first group is led out from the display area and connected to the corresponding pads in the binding area, and the second group is led out from the display area and connected to the display driving chip.

11. The touch display panel of claim 1, wherein each column of the touch electrodes corresponds to the demultiplexing circuits, in each column of the touch electrodes, two adjacent ones of the touch electrodes are connected to different demultiplexing circuits, and at least one touch electrode is spaced between two touch electrodes connected to the same demultiplexing circuit.

12. The touch display panel of claim 11, wherein each of the demultiplexing circuits comprises:

a first-stage demultiplexing circuit, each of the first-stage demultiplexing circuit comprises a plurality of first demultiplexers, and a signal input terminal of each of the first demultiplexers connected to a corresponding one of the touch signal lines; and a second-stage demultiplexing circuit, each of the second-stage demultiplexing circuit comprises a plurality of second demultiplexers, a signal input terminal of each of the second demultiplexers connected to signal output terminals of at least two of the first demultiplexers, and a plurality of signal output terminals of the second demultiplexers are connected to the same touch channel signal line.

13. The touch display panel of claim 12, wherein the touch display panel further comprises a first high-frequency detection signal line, a ground signal line, and a plurality of detection control signal lines, and each of the first demultiplexers comprises a first thin film transistor, a second thin film transistor, and a third thin film transistor; and in each of the first demultiplexers, source electrodes of the first thin film transistor, the second thin film transistor, and the third thin film transistor are connected to the same touch signal line, gate electrodes of the first thin film transistor, the second thin film transistor, and the third thin film transistor are respectively connected to different detection control signal lines, a drain electrode of the first thin film transistor is connected to a signal input terminal of a corresponding one of the second demultiplexer, a drain electrode of the second thin film transistor is connected to the first high-frequency detection signal line, and a third drain electrode of the third thin film transistor is connected to the ground signal line.

14. The touch display panel of claim 13, wherein the touch display panel further comprises a second high-frequency detection signal line, and each of the second demultiplexers comprises a fourth thin film transistor and a fifth thin film transistor; and in each of the second demultiplers, a source electrode of the fourth thin film transistor and a source electrode of the fifth thin film transistor are connected with each other and are connected to the drain electrodes of the first thin film transistors of at least two of the first demultiplexers, a drain electrode of the fourth thin film transistor is connected to the touch channel signal line, a gate electrode of the fourth thin film transistor is connected to a corresponding one of the detection control signal lines, a drain electrode of the fifth thin film transistor is connected to the second high-frequency detection signal line and the ground signal line, and a gate electrode of the fifth thin film transistor is connected to a corresponding one of the detection control signal lines.

15. A display device, comprising a touch display panel, the touch display panel comprising:
- a plurality of touch electrodes arranged in an array and insulated from one another;
- a plurality of touch signal lines, each of the touch electrodes connected to a first terminal of a corresponding one of the touch signal lines;
- a plurality of demultiplexing circuits, signal output terminals of each of the demultiplexing circuits connected to second terminals of multiple of the touch signal lines;
- a plurality of touch channel signal lines, a terminal of each of the touch channel signal lines connected to a signal input terminal of a corresponding one of the demultiplexing circuits, the demultiplexing circuits configured to selectively electrically connect one of the multiple of the touch signal lines to a corresponding one of the touch channel signal lines;
- a plurality of pads, the other terminal of each of the touch channel signal lines connected to a corresponding one of the pads; and
- a driving chip, the driving chip electrically connected to the pads;

wherein the touch display panel comprises:
- a binding area disposed at one side of the display area, the pads disposed in the binding area; and
- wherein at least two demultiplexing circuit areas are disposed in parallel between the binding area and the display area, and in the demultiplexing circuit areas, a plurality of detection control signal lines for connecting control terminals of the demultiplexing circuits to the pads and the touch channel signal lines are disposed on a side of a metal layer where a plurality of power signal lines are located away from metal layers where a plurality of data signal lines and a plurality of gate driving signal lines are located.

16. The display device of claim 15, wherein the touch display panel comprises:
- a display area;
- wherein the demultiplexing circuits are disposed between the binding area and the display area.

17. The display device of claim 16, wherein at least two demultiplexing circuit areas are disposed in parallel between the binding area and the display area, the demultiplexing circuits are disposed in the demultiplexing circuit areas, the touch display panel comprises a plurality of display signal lines, and the display signal lines led out from the display area are respectively disposed between the adjacent demultiplexing circuit areas and at sides of the demultiplexing circuit areas close to edges of the touch display panel.

18. The display device of claim 17, wherein the data signal lines led out from the display area are disposed between the adjacent demultiplexing circuit areas.

19. The display device of claim 18, wherein the gate driving signal lines led out from the display area are disposed between each of the demultiplexing circuit areas and a corresponding one of the edges of the touch display panel.

* * * * *